J. HARTNESS.
TAPER TURNING MECHANISM.
APPLICATION FILED SEPT. 6, 1911.
1,036,104.
Patented Aug. 20, 1912.
3 SHEETS—SHEET 2.
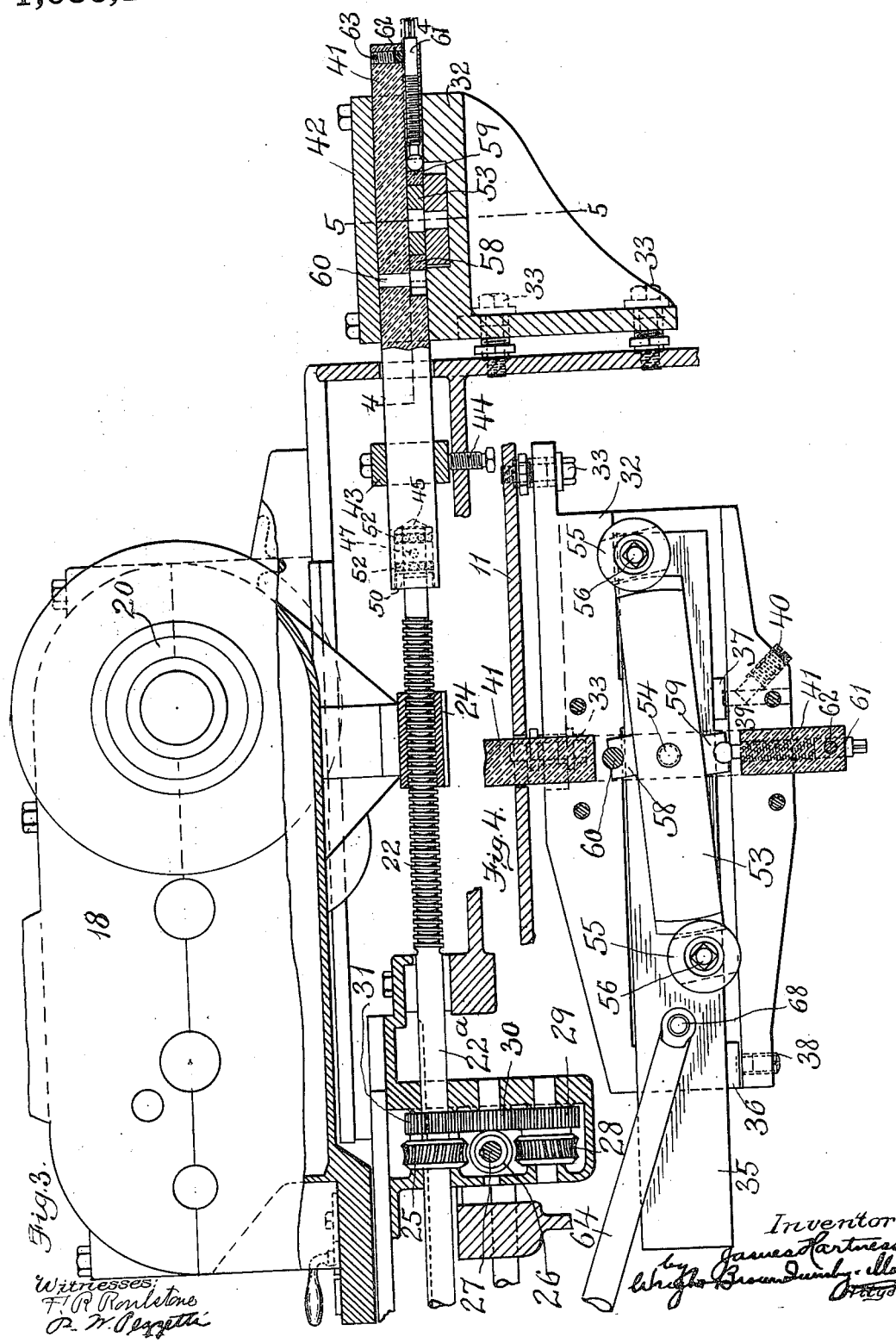

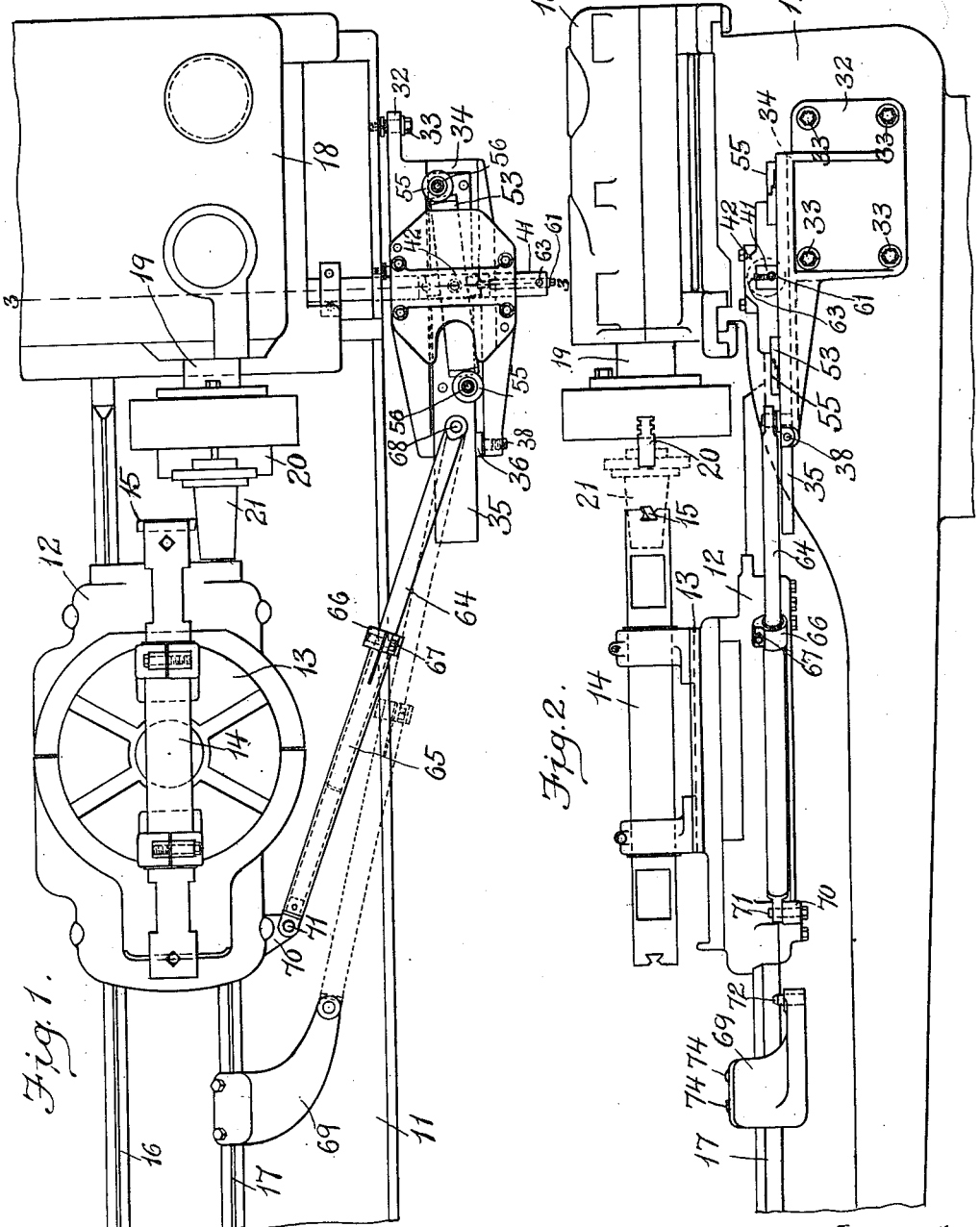

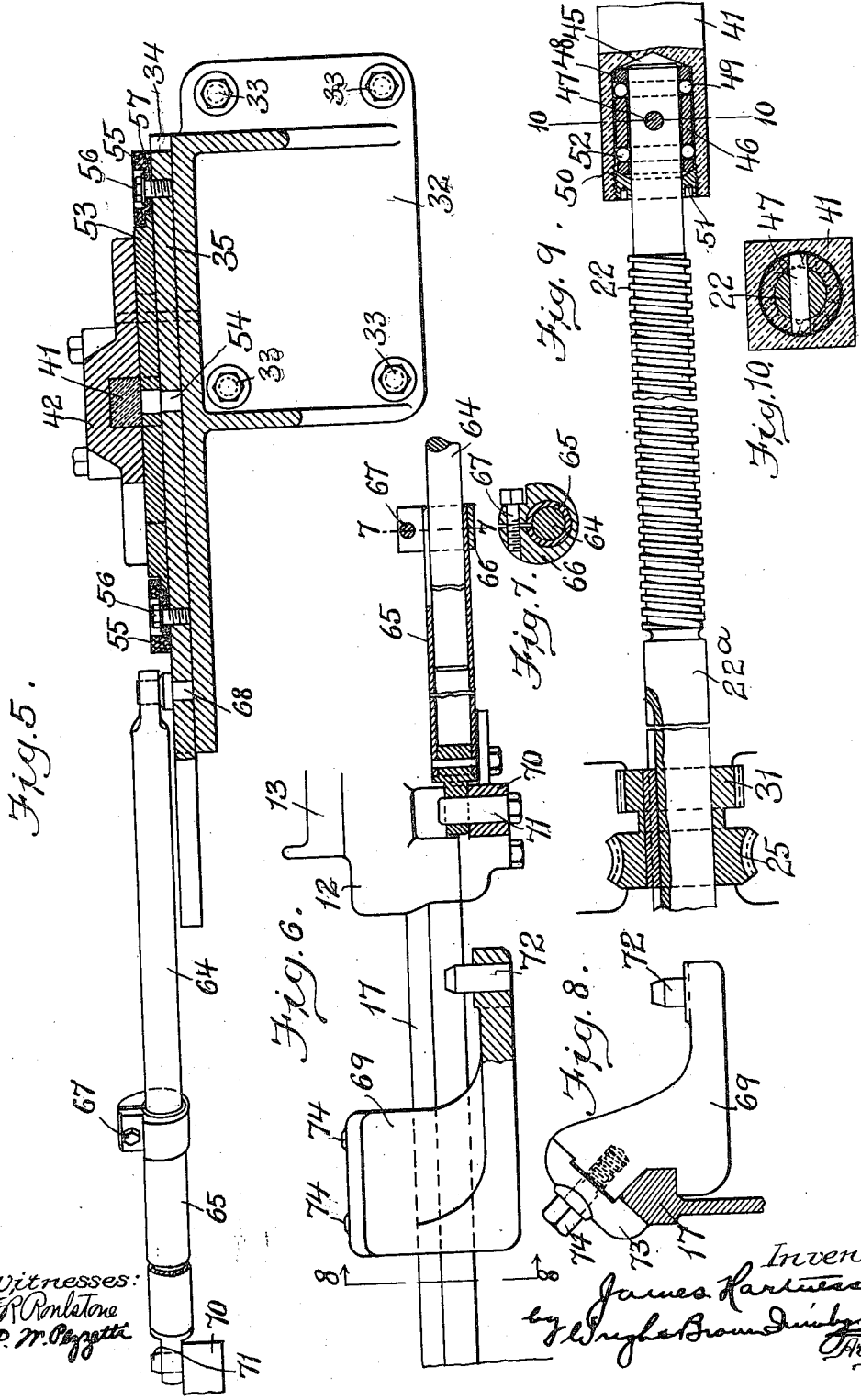

UNITED STATES PATENT OFFICE.

JAMES HARTNESS, OF SPRINGFIELD, VERMONT.

TAPER-TURNING MECHANISM.

1,036,104.

Specification of Letters Patent. Patented Aug. 20, 1912.

Application filed September 6, 1911. Serial No. 647,874.

*To all whom it may concern:*

Be it known that I, JAMES HARTNESS, a citizen of the United States, and resident of Springfield, in the county of Windsor and State of Vermont, have invented certain new and useful Improvements in Taper-Turning Mechanism, of which the following is a specification.

This invention has relation to taper-turning tools and has for its object to provide an attachment which may be employed in connection with lathes such as that illustrated in Letters Patent No. 792,591, granted to me the twentieth day of June, 1905.

The invention contemplates a templet arranged to slide substantially parallel with the longitudinal movement of the tool carriage for moving the headstock, and therefore the work, crosswise or laterally with reference to the cutter.

Referring to the drawings: Figure 1 represents in plan view my taper-turning attachment and a portion of the lathe upon which it is mounted. Fig. 2 represents a side elevation of the same. Fig. 3 represents an enlarged section on the line 3—3 of Fig. 1. Fig. 4 represents a section on the line 4—4 of Fig. 3. Fig. 5 represents a section on the line 5—5 of Fig. 3. Fig. 6 shows the means for connecting the telescoping rod with the tool carriage or with the stationary bracket on the bed. Fig. 7 represents a section on the line 7—7 of Fig. 6 and shows the means for clamping the sections of the telescopic rod together. Fig. 8 illustrates the stationary bracket, being in effect the section on line 8—8 of Fig. 6. Fig. 9 represents the feed screw for the cross-sliding head and illustrates in section the connection between the screw and the cross slide on the taper-turning attachment. Fig. 10 represents a section on the line 10—10 of Fig. 9.

The same reference characters indicate the same or similar parts wherever they occur.

Referring to the drawings, the bed of the lathe is indicated at 11, and the tool slide or carriage is indicated at 12. The carriage is illustrated as being provided with a flat turret 13 which in the present instance is equipped with a turning tool consisting of a bar 14 having a cutter 15. The carriage is moved upon ways or shears indicated at 16, 17. The carriage is fed by hand or by power, any suitable mechanism such as that set forth in my previous patent being utilized for this purpose. The cross-sliding head 18 is provided with a power-driven spindle 19 having a chuck 20 in which the work to be tapered may be clamped, a piece of work being indicated at 21. The mechanism for effecting the forward and reverse cross-sliding movement of the head includes a feed screw 22 (see Fig. 3) which is engaged with a nut 24 formed on or secured to the under side of the head. The feed screw has an unthreaded slotted portion on which is splined a portion of the gearing which effects its rotation, and it may also be rotated manually. Any suitable gearing may be utilized for this purpose, such as that illustrated in my previous patent. As shown in the present drawings, it includes a worm wheel 25 splined on the unthreaded portion 22ª of the feed screw. A worm 26 on a power-driven shaft 27 may be engaged with the worm wheel for effecting the rotation of the feed screw in one direction. Below the worm there is a second worm wheel 28 with which the worm may be engaged, and from said worm wheel power is transmitted to the feed screw through the intermediate gears 29, 30 and 31, the latter being splined on the unthreaded portion 22ª of the feed screw. The gearing which I have described is located in a suitable chamber formed in the bed of the lathe. Any suitable means may be utilized for shifting the worm 26 into engagement with the worm wheels 25, 28, so that the feed screw may be rotated in one direction or the other to effect the cross feed of the head forward or back and thereby move the work with reference to the tool. By having a splined connection between the gearing and the feed screw it is possible to effect a transverse feed of the head by moving the feed screw itself endwise of its axis.

The taper-turning attachment is connected with the tool slide and also with the feed screw for the head so that a movement of the said slide is transmitted to the feed screw, the extent or rapidity of movement of the feed screw, and therefore of the head and the work, being determined by the position of the templet which forms a part of the taper-turning attachment. The attachment includes, in the illustrated embodiment of the invention, a bracket 32 which is secured to the rear side of the bed of the lathe by any suitable screws or bolts, as shown in Figs. 1 and 2, said screws or bolts being indicated at 33. The bracket, however, may be integral with the bed instead of being attached thereto. The bracket constitutes a support which is provided with a groove or guideway 34 for what I term a longitudinal slide 35. This slide is held against one side wall of the groove by blocks 36, 37, interposed between the slide 35 and the other side wall of the groove. The block 36 is adjusted in position by a screw pin 38, while the block 37 is adjusted by a pin 39 and a screw pin 40 bearing against the beveled end thereof, as shown in Fig. 4.

Located above the longitudinal slide there is a cross slide 41 which is held in place by a cap 42 secured upon the support. This cross slide projects into the bed through a guide 43 which is clamped to a web on the bed, and is adjusted relatively thereto by an adjusting screw 44. The inner end of the cross slide has a socket 45 (see Fig. 9) into which the unthreaded end of the feed screw projects. I find it convenient to provide an anti-friction bearing between the cross slide and the screw, which may take the form of a sleeve 46 secured to the screw by a pin 47. Between the end of the sleeve and a washer 48 which bears against the inner end of the socket 45 I place anti-friction balls or rollers 49; and between the other end of the sleeve and a washer 50 which bears against a collar 51 screwed into the threaded end of the socket I interpose similar balls or rollers 52. Thus I provide a thrust bearing by which the sliding movement of the cross slide is transmitted to the feed screw without friction. By removing the threaded collar 51 the cross slide may be easily detached from the feed screw.

Upon the longitudinal slide 35 I clamp a templet 53 which may be of any desired shape, according to the character of the work to be turned. As illustrated, it consists of a flat bar having parallel sides. Midway between its ends it is pivoted by a pin 54 to the longitudinal slide 35. Its ends are curved and rabbeted, as shown in Figs. 4 and 5, so as to be engaged by clamps 55, 55, secured to the longitudinal slide by screws 56, 56. The outer edge of each of these clamps has a shoulder 57 which rests upon the longitudinal slide 35 and which serves as a fulcrum when the screws 56 are driven home so as to cause the engaging portions of the clamp to engage the templet and bind it securely upon the longitudinal slide in the position in which it may have been adjusted. The cross slide is cut away, as shown in Figs. 3 and 4, to receive the templet, and bearing blocks 58, 59 carried by the cross slide engage the sides of the templet. The bearing block 58 is pivoted on the head of a pin 60 passed into the cross slide, and the block 59 is pivoted on the spherical end of a screw pin 61 by which the block 59 may be adjusted so as to bear evenly against the templet. The two blocks have opposing faces between which the templet may slide, and by the mechanism explained may be adjusted one with reference to the other. The screw pin 61, after being adjusted, may be locked in position by a pin 62 and a screw 63, as shown by Fig. 3. The angle at which the templet 53 is set determines the taper of the work. That will readily be understood.

The connection between the longitudinal slide 35 and the tool carriage 12 consists of a telescopic rod or link which comprises the two sections 64, 65. One section consists of a rod, while the other consists of a sleeve into which the rod extends, the sleeve section being split as shown in Fig. 7. On the split end of the sleeve I place a split ring clamp 66, the ends of which are drawn together by screws 67, so that after the link has been extended or contracted its sections may be secured together against further relative movement thereof. One end of the extensible or telescopic rod is pivoted to the longitudinal slide 35 by a stud 68, and the other end of the link or rod may be connected with either the tool slide or with a bracket 69 clamped to the bed. It will be noted that the tool slide has a lug 70 with a pin 71 with which the apertured end of the section 65 may be engaged as shown in Fig. 6. The bracket 69 is clamped to the way or shear 17 and it, too, is provided with a pin 72 with which the apertured end of the section 65 may be engaged, as shown in dotted lines in Fig. 1. The bracket 69 is shaped to engage the way or shear 17 and is provided with a clamping member 73 secured in place by a screw 74.

In operation, the templet having been adjusted to the desired angle, the telescopic rod or link is connected to the tool carriage, and when the carriage is fed toward the head it causes the longitudinal slide or member 35 to move with it and thus move the templet. The longitudinal movement of the templet effects a movement of the cross slide or member 41, which, being connected to the work-carrying head, moves the work laterally with reference to the tool. In the event that the operator desires to take a second cut on the same taper, he may rotate the feed screw 22 so as to adjust the work to a new position prior to the next length feed of the work and cross feed of the cross slide 41.

The attachment as I have described it is simple in construction and efficient and accurate in operation without danger of lost motion between the parts. When the work is to be turned on the same diameter throughout, the extensible or telescopic rod or link is detached from the tool slide or carriage and is connected to the bracket 69 so that the templet will remain stationary during the travel of the tool slide, the cross feed of the head in this instance being secured by the gearing which I have described, or by hand.

Having thus explained one embodiment of the invention, without attempting to set forth all of its forms, or all the modes of its use, what I claim is:

1. A taper-turning mechanism comprising a cross slide adapted to be connected to the work-carrying head, a longitudinal slide adapted to be engaged with the tool carriage and to be moved longitudinally thereby, and a templet on said longitudinal slide engaged with the cross slide.

2. The combination with a bed, a longitudinally movable tool carriage, and a transversely movable work-carrying head, of a longitudinal slide connected to said carriage to be moved thereby, a cross slide connected to said head, and a templet on and movable with said longitudinal slide and engaged with said cross slide.

3. The combination with a bed, a longitudinally movable tool carriage, and a transversely movable work-carrying head, of a longitudinal slide connected to said carriage to be moved thereby, a cross slide connected to said head, a templet on and movable with said longitudinal slide and engaged with said cross slide, and means for securing said templet on said longitudinal slide at any desired angle to its path of movement.

4. The combination with a bed, a longitudinally movable tool carriage, and a transversely movable work-carrying head, of mechanism for moving said head transversely comprising a feed screw and gearing splined thereto for rotating the feed screw, a cross slide connected with said head, a longitudinal slide connected with said carriage to be moved longitudinally thereby, and a templet on the longitudinal slide engaged with the cross slide.

5. The combination with a bed, a longitudinally movable tool carriage, and a laterally movable work-carrying head, of head-feeding mechanism comprising a nut on the head and a feed screw on the bed adapted to be rotated to feed the head, a cross slide connected with said screw, a longitudinal slide connected with said carriage to be moved longitudinally thereby, and a templet on the longitudinal slide engaged with the cross slide.

6. A taper-turning attachment for a lathe having a cross-sliding work-carrying head, said attachment comprising a support, a longitudinal slide thereon, a link connected to said slide and adapted to be connected to the tool slide of the lathe, a cross slide having provisions for engagement with the cross-sliding head of the lathe, and a templet carried by the longitudinal slide and engaged with said cross slide.

7. A taper-turning attachment comprising a support, having a longitudinal guideway, and a transverse guideway, a longitudinal slide in the first-mentioned guideway, a cross slide in the second-mentioned guideway, a templet on said longitudinal slide, means for securing it on said slide at any desired angle, and means on the cross slide for engaging said templet, whereby the movement of said longitudinal slide and the templet effect the cross movement of the cross slide.

8. A taper-turning attachment comprising a support, having a longitudinal guideway, and a transverse guideway, a longitudinal slide in the first-mentioned guideway, a cross slide in the second-mentioned guideway, a templet on said longitudinal slide, means for securing it on said slide at any desired angle, and opposing blocks pivoted on said cross slide for embracing the templet.

9. The combination of a bed having a stud, a longitudinally movable tool carriage having a stud, a work-carrying cross-sliding head, a longitudinal slide supported by the bed, an extensibly adjustable link pivoted to said slide and adapted to be pivotally engaged with either of said studs, a cross slide supported by said bed having provision for detachably connecting it with said head, and a templet adjustably mounted on and carried by the longitudinal slide in operative engagement with the cross slide.

In testimony whereof I have affixed my signature, in presence of two witnesses.

JAMES HARTNESS.

Witnesses:
G. W. CLARE,
J. W. WALKER.